Patented Nov. 12, 1935

2,020,453

UNITED STATES PATENT OFFICE 2,020,453

PRODUCTION OF ASSISTANTS FOR THE TEXTILE AND RELATED INDUSTRIES

Hans Beller, Ludwigshafen-on-the-Rhine, and Hermann Schuette, Mannheim, Germany, assignors to I. G. Farbenindustrie Aktiengesellschaft, Frankfort-on-the-Main, Germany No Drawing. Application May 2, 1931, Serial No. 534,706. In Germany May 13, 1930. Renewed May 13, 1933

13 Claims. (Cl. 252—1)

The present invention relates to the production of assistants for the textile and related industries.

It has already been proposed to act on oxidation products of non-aromatic hydrocarbons of high molecular weight i. e. containing at least 8 carbon atoms, or mixtures thereof, which oxidation products, as is well known, usually consist mainly of carboxylic acids and unattacked initial material, in some cases in admixture with neutral oxidation products such as alcohols, aldehydes or ketones and the like and olefines formed from alcohols or ketones, with sulphonating agents and to employ the resulting sulphonation products as such or after neutralization with alkalies as wetting, emulsifying, washing and the like agents. These sulphonation products, however, often have the undesirable property of forming insoluble calcium salts in water containing lime.

We have now found that products having very high wetting, emulsifying, washing and the like powers, which are not precipitated by calcium compounds, are obtained by employing, as initial materials for the sulphonation, products of the incomplete destructive oxidation of non-aromatic hydrocarbons of high molecular weight, from which products unattacked initial material has been separated in any known and convenient manner and which contain alcohols and/or equivalent olefines in considerable amounts. The amount of the alcohols and/or olefines contained in the products to be sulphonated may vary within wide limits but should be at least 15 per cent by weight of the oxidation product. It varies according to the nature of the acid constituents and may be readily determined by a simple test as by the determination of the acetyl and iodine values. The said oxidation products can be obtained by carrying out the oxidation in the presence of at least 2 per cent of the initial materials of free organic or inorganic acids such as acetic acid, boric acid and the like so that products are directly obtained which contain a considerable proportion, as for example from 30 to 40 per cent of alcohols and/or olefines. A further increase of the content of alcohols can be attained, after the separation of unattacked initial material, by washing the products with small quantities of aqueous solutions of alkaline agents whereby the quantity of acids is reduced. It is not necessary to impart the necessary composition to the oxidation products by carrying out the oxidation in a special manner as already pointed out or by fractionating, but an oxidation product from which sulphonation products are obtained which give water-insoluble calcium salts may be altered in the desired manner by adding any high molecular alcohols, such as cetyl or lauryl alcohols, or olefines, as can be obtained for example in dehydrogenating petroleum or middle oils.

As initial materials for the oxidation may be mentioned for example oxidation products of difficultly volatile, i. e. solid or liquid, paraffin or naphthene hydrocarbons or mixtures thereof, such as hard or soft paraffin waxes, ceresine, heavy or middle oils, paraffin oil, mineral oil or tar fractions, or oxidation products of synthetically prepared hydrocarbons, as for example those obtained by the destructive hydrogenation of coal, brown coal, mineral oils, tars and the like.

The sulphonation of the oxidation products having a considerable content of neutral oxidation products is effected in the usual manner as for example by treatment with concentrated sulphuric acid, oleum, chlorsulphonic acid, gaseous sulphur trioxide and like sulphonating agents, if desired in the presence of solvents or diluents, such as chloroform, carbon tetrachloride, trichlorethylene, ethyl ether or nitrobenzene. The employment of catalysts, such as active carbon, and the presence of agents removing water, such as acids, acid anhydrides or acid chlorides as for example phosphorus pentoxide, acetic anhydride or acetyl chloride is frequently advantageous in the sulphonation. By working with a mild sulphonating agent, such as sulphuric acid, at a low temperature as for example not exceeding 40° C., sulphuric esters are obtained, whereas on working at temperatures above 100° C. sulphonic acids are formed which latter are mainly formed on working with sulphur trioxide or mixtures containing a large proportion thereof even at low temperatures. The sulphonation products may be worked up in any suitable manner, as for example by diluting the reaction mixture with ice and water, removing the solvent, if such be employed, and any excess of sulphonating agent and neutralizing with alkalies. In many cases it is advantageous to remove any slight sensitiveness to lime in the sulphonated products by the addition of sulphonated alcohols or olefines and the like. The sulphonation products are obtained in practically quantitative yields. They have an excellent wetting, washing and emulsifying power in alkaline, acid or neutral baths and are not precipitated by the calcium compounds of hard water.

The following examples will further illustrate the nature of this invention but the invention is not restricted to these examples.

Example 1

Paraffin wax having a melting point of 56° C. is oxidized in the presence of 2 per cent of its weight of boric acid at about 160° C. by blowing through a current of air while circulating the paraffin wax in a cycle through the reaction vessel, whereby a solid oxidized product containing 50 per cent of unsaponifiable matter is obtained after 6 hours. The reaction product is then warmed in the course of a few hours from 15° C. to from 38° to 40° C. whereby the liquefied portions of the oxidation product are drawn off so that a solid paste of non-oxidized paraffin wax remains. 100 parts of the oxidation product thus freed from unattacked paraffin wax and having a content of alcohols of high molecular weight of about 30 per cent are sulphonated by slowly introducing at 35° C. and while stirring 30 parts of chlorsulphonic acid, the hydrogen-chloride formed being continuously removed by blowing through air. After the chlorsulphonic acid has been introduced the reaction mixture is stirred for 24 hours by passing through air and is then diluted with the aid of a mixture of ice and water and finally rendered neutral with aqueous caustic soda solution. Notwithstanding the content of carboxyl groups the sulphonation product is not precipitated from aqueous solutions thereof by compounds of lime.

Example 2

Soft paraffin wax having a melting point of 44° C. is blown with air at 160° C. for 6 hours and in the presence of 0.1 per cent by weight of the wax of manganese naphthenate and of 1 per cent of boric acid. The reaction product is freed from unattacked wax as described in Example 1 and then contains about 25 per cent of alcohol besides carboxylic acids, lactones and other oxygenated products.

100 parts of this product are dissolved in 400 parts of carbon tetrachloride and are sulphonated by introducing sulphur trioxide at 30° C. while stirring, until the product is soluble in water. After neutralizing the reaction product with an alkali metal hydroxide, a valuable washing, scouring, emulsifying and wetting-out agent is obtained.

Example 3

2 parts by volume of an oxidation product obtained by oxidizing Russian gas oil (boiling, at atmospheric pressure, from 180° to 350° C.), in the presence of 3 per cent of its weight of glacial acetic acid at 160° C. with the aid of air are stirred together with 8 parts by volume of liquid sulphur dioxide at 28° C. in a pressure-tight vessel. After a short standing two layers are formed; the lower layer is drawn off and freed from sulphur dioxide, whereby an oxidation product free from unattacked initial material is obtained in a quantity of 80 per cent of the crude oxidation product.

This oxidation product which contains about 30 per cent of hydroxyl-bearing compounds is freed from free carboxylic acids by washing with a 5 per cent aqueous soda solution and is then stirred for several hours at 105° C. with 40 per cent of its weight of concentrated sulphuric acid. After cooling and washing with a 10 per cent aqueous solution of sodium sulphate, the product is neutralized with the aid of dilute aqueous caustic soda solution.

Example 4

Paraffin wax having a melting point of 56° C. is oxidized in the presence of 2 per cent its weight of boric acid by blowing air at 160° C. into the wax which is circulated through the reaction vessel, an overflow and a return to the bottom of the vessel, the reaction being stopped after 6 hours until a product having a content of about 50 per cent of unsaponifiable constituents is obtained. The product is then cooled and subsequently gradually warmed in the course of several hours from 15° to from 38° to 40° C., the liquefied constituents of the oxidation product being continuously drawn off at slightly decreased pressure, whereby a solid mass of non-oxidized paraffin wax remains. 100 parts of the portion of oxidation product drawn off and freed from unattacked initial wax and having a content of about 30 per cent of alcohols of high molecular weight are incorporated with 30 parts of chlorsulphonic acid slowly dropped into the wax at 35° C. while stirring and simultaneously blowing air through the reaction mixture for removing hydrogen chloride formed. After the whole quantity of acid has been introduced stirring is continued for 24 hours while blowing through air. The reaction product is then diluted with a mixture of ice and water and rendered neutral with the aid of aqueous soda solution. The product obtained does not show any substantial precipitation of lime salts when employed with hard wax.

Example 5

Soft paraffin wax having a melting point of 44° C. is blown with air for 6 hours at 160° C. in the presence of 0.1 per cent of manganese naphthenate and 1 per cent of boric acid. The reaction product is separated from paraffin wax as described in Example 3 and then contains about 50 per cent of alcohols of high molecular weight besides fatty acids, lactones and other acid derivatives.

100 parts of the said product are dissolved in 400 parts of carbon tetrachloride and then sulphonated by means of gaseous sulphur trioxide. After the sulphonation the reaction product is rendered neutral with the aid of caustic alkali, whereby a product suitable as a washing, cleansing and wetting agent resistant to hard water is obtained.

Example 6

2 parts by volume of an oxidation product, prepared by the oxidation, at 160° C., with air of a Russian gas oil (boiling, at atmospheric pressure, from 180° to 350° C.) in the presence of 3 per cent its weight of glacial acetic acid, are stirred at 28° C. in a pressure-tight vessel with 8 parts by volume of liquid sulphur dioxide. After standing for a short time, whereby the whole is separated into two layers, the lower layer is separated and, after removing sulphur dioxide, an oxidation product is obtained in a yield of 80 per cent which is free from unattacked initial material.

For removing about 50 per cent of free fatty acid from the product, containing about 30 per cent of hydroxyl-bearing compounds, the latter is washed at about 50° C. with an about equal quantity of an aqueous 5 per cent soda solution. The product thus enriched in alcohols to about double the original quantity is then stirred for several hours at 105° C. with 40 per cent its weight of concentrated sulphuric acid. After the sulphonation the reaction product, consisting of sulphuric esters and of sulphonic acids, is cooled, washed with an aqueous 10 per cent solution of sodium sulphate and then rendered neutral with aqueous caustic soda solution.

Example 7

90 parts of an oxidation product prepared from Russian gas oil (boiling, at atmospheric pressure, from 180° to 350° C.) and isolated with liquid sulphur dioxide as described in Example 6 are mixed with 10 parts of cetyl alcohol and sulphonated in accordance with any of the foregoing examples. After neutralizing the resulting aqueous solution by means of triethanolamine, a washing and emulsifying agent is obtained which is not precipitated from its aqueous solutions by lime salts.

Instead of carrying out the sulphonation with a mixture of said oxidation product and said alcohol, a sulphonation product of the said alcohol or of a corresponding olefine may be added to a sulphonated oxidation product whereby the same effect of resistance to lime is attained.

What we claim is:—

1. The process for the production of assistants for the textile and related industries which comprises acting with a sulphonating agent on a product from the incomplete liquid phase oxidation of non-aromatic hydrocarbons of high molecular weight from which product only non-oxidized hydrocarbon material has been separated and which contains at least 15 per cent of alcohols and olefines.

2. Assistants for the textile and related industries comprising sulphonated products from the incomplete liquid phase oxidation of non-aromatic hydrocarbons of high molecular weight from which product only non-oxidized hydrocarbon material has been separated and which contains at least 15 per cent of alcohols and olefines.

3. Assistants for the textile and related industries comprising sulphonated products from the incomplete liquid phase oxidation of paraffin wax from which product only non-oxidized hydrocarbon material has been separated and which contains at least 15 per cent of alcohols and olefines.

4. Assistants for the textile and related industries comprising sulphonated products from the incomplete liquid phase oxidation of a middle oil (boiling, at atmospheric pressure, from 180° to 350° C.) from which product only non-oxidized hydrocarbon material has been separated and which contains at least 15 per cent of alcohols and olefines.

5. Assistants for the textile and related industries comprising sulphonated products from the incomplete liquid phase oxidation of non-aromatic hydrocarbons of high molecular weight from which product only non-oxidized hydrocarbon material has been separated and which contains from 30 to 40 per cent of alcohols and olefines.

6. The process for the production of assistants for the textile and related industries which comprises acting with a sulphonating agent on a product of the incomplete liquid phase oxidation in the presence of a free acid, of non-aromatic hydrocarbons of high molecular weight from which product only non-oxidized hydrocarbon material has been separated.

7. The process for the production of assistants for the textile and related industries which comprises acting with a sulphonating agent on a mixture of a product of the incomplete liquid phase oxidation of non-aromatic hydrocarbons of high molecular weight from which product only non-oxidized hydrocarbon material has been separated and a substance selected from the group consisting of high molecular weight alcohols and olefines.

8. The process for the production of assistants for the textile and related industries which comprises acting with a sulphonating agent on a mixture of a product of the incomplete liquid phase oxidation of non-aromatic hydrocarbons of high molecular weight from which product only non-oxidized hydrocarbon material has been separated and lauryl alcohol.

9. The process for the production of assistants for the textile and related industries which comprises acting with a sulphonating agent on a mixture of a product of the incomplete liquid phase oxidation of non-aromatic hydrocarbons of high molecular weight from which product only non-oxidized hydrocarbon material has been separated and cetyl alcohol.

10. The product resulting from the sulphonation of the product of incomplete liquid phase oxidation in the presence of a free acid, of non-aromatic hydrocarbons of high molecular weight from which oxidation product only non-oxidized hydrocarbon material has been separated.

11. A composition of matter comprising the product resulting from the sulphonation of the product of incomplete liquid phase oxidation of non-aromatic hydrocarbons of high molecular weight from which product only non-oxidized hydrocarbon material has been separated and a sulphonated substance selected from the group consisting of high molecular aliphatic alcohols and olefines.

12. A composition of matter comprising the product resulting from the sulphonation of the product of incomplete liquid phase oxidation in the presence of a free acid, of non-aromatic hydrocarbons of high molecular weight from which oxidation product only non-oxidized hydrocarbon material has been separated and sulphonated lauryl alcohol.

13. A composition of matter comprising the product resulting from the sulphonation of the product of incomplete liquid phase oxidation in the presence of a free acid, of non-aromatic hydrocarbons of high molecular weight from which oxidation product only non-oxidized hydrocarbon material has been separated and sulphonated cetyl alcohol.

HANS BELLER.
HERMANN SCHUETTE.